United States Patent [19]
Kurple

[11] Patent Number: 6,017,127
[45] Date of Patent: Jan. 25, 2000

[54] ILLUMINATION SYSTEM FOR A DIAL OF A TIMEPIECE

[75] Inventor: William M. Kurple, Middlebury, Conn.

[73] Assignee: Timex Corporation, Middlebury, Conn.

[21] Appl. No.: 09/002,612

[22] Filed: Jan. 5, 1998

[51] Int. Cl.[7] .................................................. G09B 19/30
[52] U.S. Cl. .............................. 362/29; 368/67; 362/23; 362/26
[58] Field of Search ................... 362/23, 26, 27, 362/29, 30, 551, 800; 368/67

[56] References Cited

U.S. PATENT DOCUMENTS

| | | | |
|---|---|---|---|
| 4,026,103 | 5/1977 | Ichikawa et al. | 58/50 R |
| 4,323,951 | 4/1982 | Pasco | 362/27 |
| 4,771,368 | 9/1988 | Tsukamoto et al. | 362/29 |
| 5,639,158 | 6/1997 | Sato | 362/247 |

*Primary Examiner*—Laura K. Tso
*Attorney, Agent, or Firm*—Arthur G. Schaier

[57] ABSTRACT

A wristwatch dial illumination system with a light guide beneath a light transmissive dial receiving light from an LED mounted on a PC board below the light guide. A pattern of white reflective dots on the bottom surface of the light guide selectively ejects internally reflected light toward the dial and an absorption pattern of light absorbing material selectively absorbs ejected light, including the bright spot from the LED.

21 Claims, 5 Drawing Sheets

ILLUMINATION SYSTEM FOR A DIAL OF A TIMEPIECE

This invention relates generally to illumination systems for instrument dials and more particularly to an improved illumination system for a wristwatch dial.

BACKGROUND OF THE INVENTION

It is known to provide instruments such as wristwatches with a light source for illuminating the dial. The wristwatch dial may be an analog wristwatch dial having indicia or markers used in connection with hands of the watch, or the dial may comprise an electro-optic display of actuated indicia, such as a liquid crystal display. One objective in a dial illumination system has been to achieve a constant and uniform lighting for the dial. Uniform background lighting may be achieved by using a distributed uniform light source, such as an electroluminescent light source. However, in order to reduce the cost of an illumination system for a dial, concentrated light sources, such as a single incandescent bulb or a light emitting diode (LED) have also been considered. One problem then, with using a concentrated light source is to transfer and diffuse the light from a point source of bright light to a uniformly distributed light source for illuminating the dial. The prior art contains many examples of efforts to effect the transformation.

In addition to illumination, light may be used to achieve an aesthetic graphic presentation. In this case it must be possible to locate areas of greater or lesser brightness or different colors at different locations on the dial. Traditional constructions using edge lighting around the outside periphery of a light guide are ineffective in directing the light to the desired location.

Constructions are known for using a light guide behind a light transmissive dial, and to inject light into the light guide. The following U.S. Patents are representative of prior art constructions for illuminating dials from a concentrated light source using a light guide.

| U.S. PAT. NO. | INVENTOR | ISSUE DATE | TITLE |
| --- | --- | --- | --- |
| 3,748,456 | Brien | July 24, 1973 | Illuminated Instrument Dials |
| 2,140,972 | Rylsky | Dec. 20, 1938 | Means for Illuminating Dials of Instruments |
| 2,188,821 | Rylsky | Jan. 30, 1940 | Compass |
| 2,480,393 | Bossert et al. | Aug. 30, 1949 | Dial Light |
| 3,043,038 | Marble | July 10, 1962 | Illuminated Dial Face |
| 3,561,145 | Shotwell | Feb. 9, 1971 | Light Distributing Lens System |

The aforementioned Marble U.S. Pat. No. 3,043,038 and Shotwell U.S. Pat. No. 3,561,145 employ light guides bounded by substantially planar surfaces and attempt to distribute the light rays which are undergoing multiple internal reflections which are introduced from a concentrated source at the peripheral edge of the light guide. These constructions employ tapered cross sections or non-uniformly distributed indentations in order to uniformly distribute the light.

U.S. Pat. No. 5,667,289 issued Sep. 16, 1997 to Akahane et al. describes a background lighting apparatus for a liquid crystal display, in which a non-uniform pattern of light dispersing reflective layers are applied to a light guide illuminated from the edges of the light guide. The reflective layers are arranged to increase in size as the distance from the lighted edge becomes greater.

It is particularly difficult to conduct light from a concentrated source to a light guide in a wristwatch from the edge of a light guide disposed beneath the watch dial. Space is at a premium and the previously known constructions have not been satisfactory.

Accordingly, one object of the present invention is to provide an improved dial illumination system which effects uniform distribution of the light to illuminate a dial.

Another object of the invention is to provide an improved construction for conducting light from a concentrated or point light source to a light guide for illuminating a dial.

Another object of the invention is to provide a construction for directing lighted areas of varying brightness and/or colors in a watch dial illumination system.

Another object of the invention is to provide an improved dial illumination system for distributing light to a wristwatch dial.

SUMMARY OF THE INVENTION

Briefly stated, the invention comprises an illumination system for a watch dial comprising a light guide including a light conducting member having a periphery and upper and lower surfaces adapted to conduct light throughout by internal reflection between the upper and lower surfaces, a dial to be illuminated disposed above the light guide, the dial comprising a light transmissive member having a periphery substantially coextensive with that of the light guide and having a lower dial surface adjacent the light guide upper surface, at least one concentrated light source disposed below and spaced from the lower surface of the light guide, a light coupling channel extending from the light source to the lower surface of the light guide, an ejection pattern on at least the lower surface of the light guide adapted to selectively eject internally reflected light from the lower surface of the light guide toward the dial, and an absorption pattern on at least the lower dial surface adapted to selectively absorb light from said light source. An ejection pattern and/or an absorption pattern may also be added to the upper surface of the light guide.

DRAWING

The invention will be better understood by reference to the following description, taken in connection with the accompanying drawings, in which:

FIG. 1 is a plan view of an analog watch with an illuminated dial,

FIG. 2 is a plan view of the watch frame and movement, removed from the case, with portions of the frame broken away to show the printed circuit board, FIG. 3 is an elevation view of the watch, in cross section, of the watch of FIGS. 1 and 2, FIG. 4 is a diagrammatic and simplified exploded elevation view illustrating the principle of operation of the present invention, FIGS. 5–8 are top plan views of the light guide using the present invention, illustrating several representative ejection patterns, FIGS. 9, 10. 11 and 12 are bottom plan views of watch dials, illustrating several representative absorption patterns, and FIGS. 13 and 14 are simplified schematic exploded elevation views of modified forms of the invention.

DESCRIPTION OF THE PREFERRED EMBODIMENT

Figure 1:
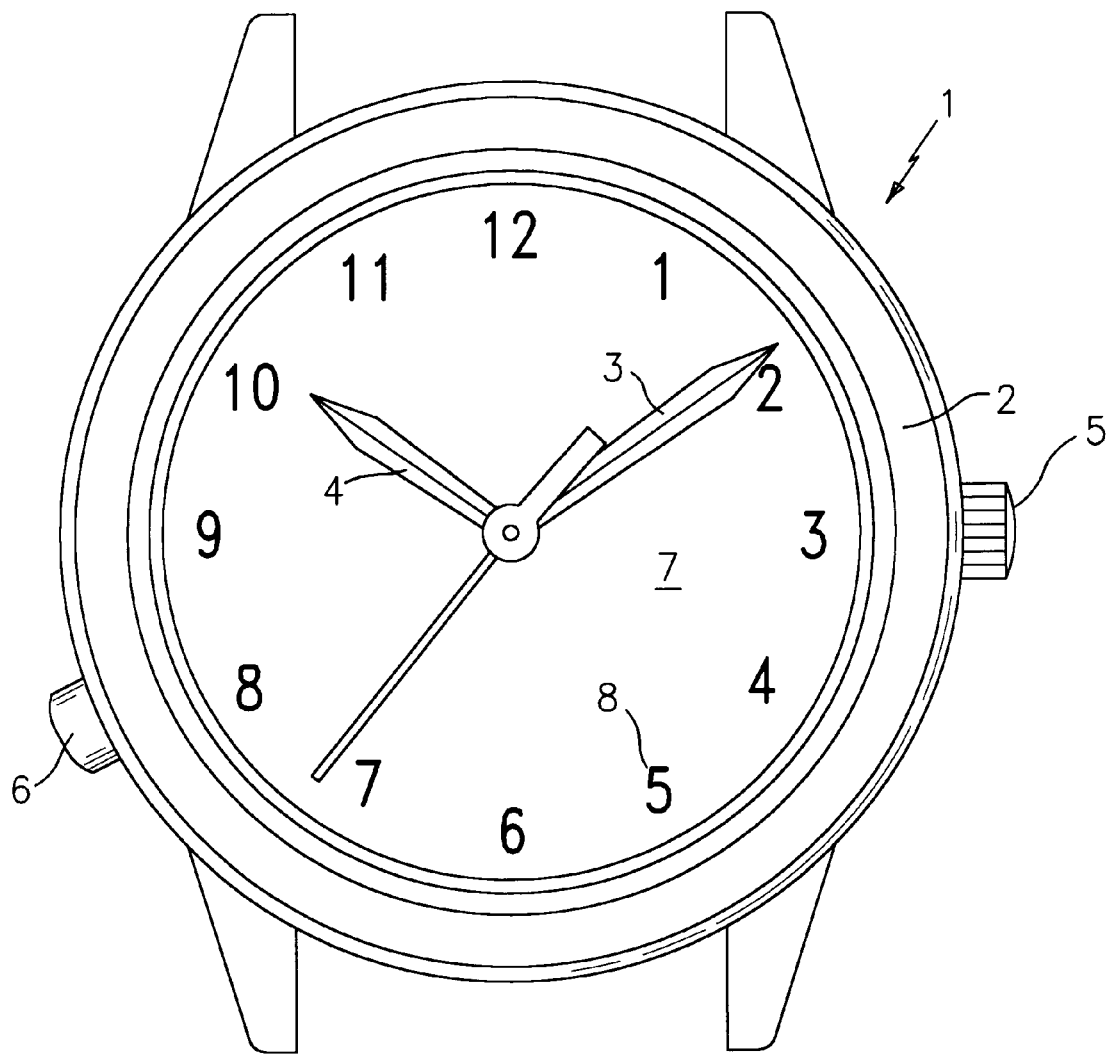

FIG. 1 illustrates a timepiece comprising a wristwatch 1 with a conventional case 2, minute hand 3 and hour hand 4 mounted on rotatable stems and driven by a conventional movement, the details of which are not material to the present invention. A crown 5 is employed to set the position of the time indicating hands 3, 4, while a push button actuator 6 is connected to actuate switch contacts (not shown) inside the case of the watch. Below the hands is a dial 7 having time-indicating indicia thereon, such as hour numerals 8. The dial 7 is constructed of light transmissive material such as glass or Mylar.

Figure 2:
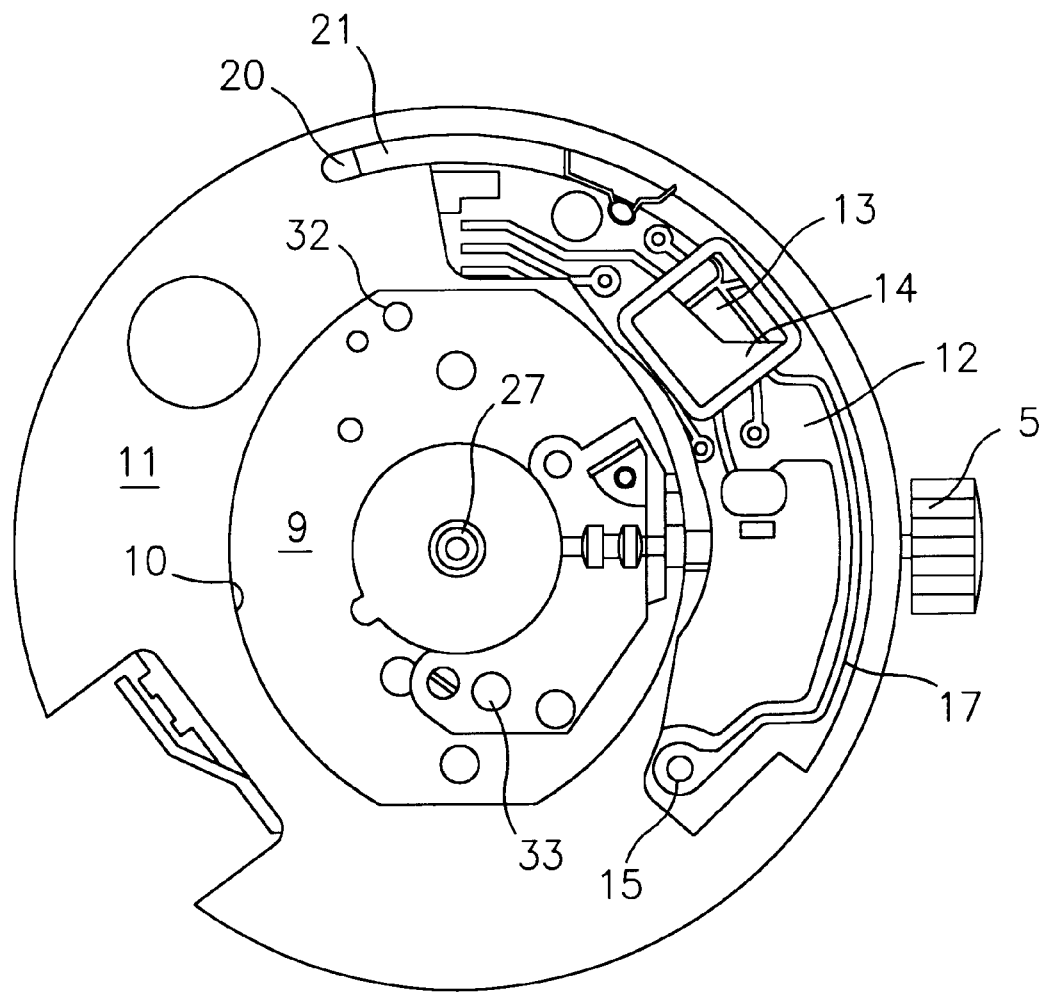

Reference to FIG. 2 of the drawing shows a plan view of the frame and movement removed from case 2, and also omitting hands 3, 4 and dial 7 in order to see the details of the assembly beneath. A conventional timepiece movement 9 is housed within a correspondingly shaped aperture 10 in a frame 11 of insulating material. Movement 9 includes a conventional quartz analog stepping motor driving a gear train to turn one or more rotatable stems 27 adapted to receive time-indicating hands. Disposed on the underside of frame 11 is a printed circuit board 12 containing electrical circuitry for operating the stepping motor, and also for causing illumination of the dial. A portion of the frame 11 is cut away in the drawing to reveal part of the printed circuit board 12. Disposed on the printed circuit board 12 is a first integrated circuit (not shown) for operating a stepping motor, and a second circuit 13 for operating a light emitting diode (LED) 15 by means of conductive leads such as 17 on the printed circuit board. The LED 15 is mounted permanently to the PC board.

Figure 3:
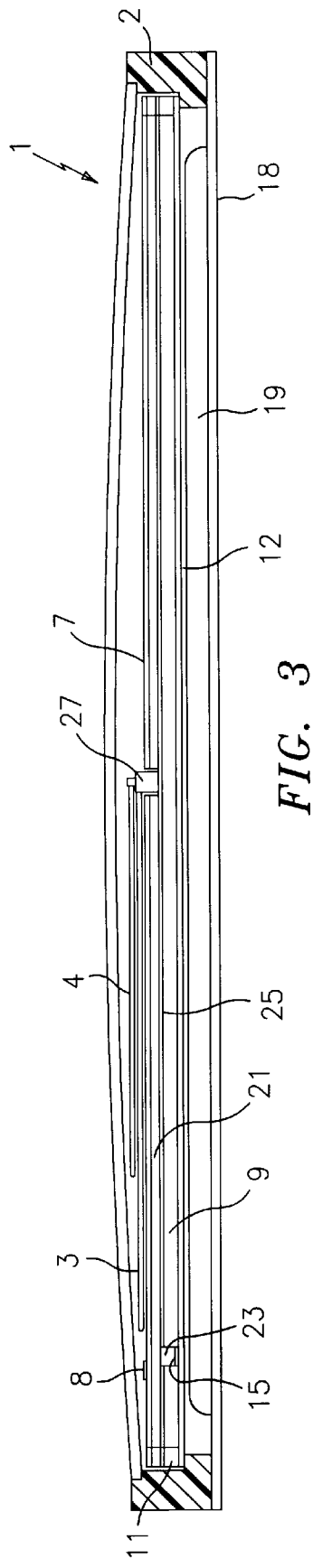

Referring to FIG. 3 of the drawing, the previously mentioned elements are drawn to scale in cross section. The watch casing 2 is closed off at the bottom by a case back 18 and contains a power source for the watch movement and illumination system, preferably comprising a lithium cell 19. The dial illumination system to be described in greater detail includes a light guide 21 disposed beneath dial 7, a light coupling channel 23 extending from LED 15 to the lower surface of light guide 21, and a reflective layer 25 disposed between the light guide 21 and movement 9. The light guide 21 has a peripheral shape substantially co-extensive with that of the dial 7 above it, e.g., circular in the illustrated timepiece. The LED 15 falls inside a circle which is projected from the light guide periphery. Movement 9 rotatably operates the hands 3, 4 by rotating the coaxial stems 27 which extend through central holes in the dial, light guide and reflective member 25.

Figure 4:
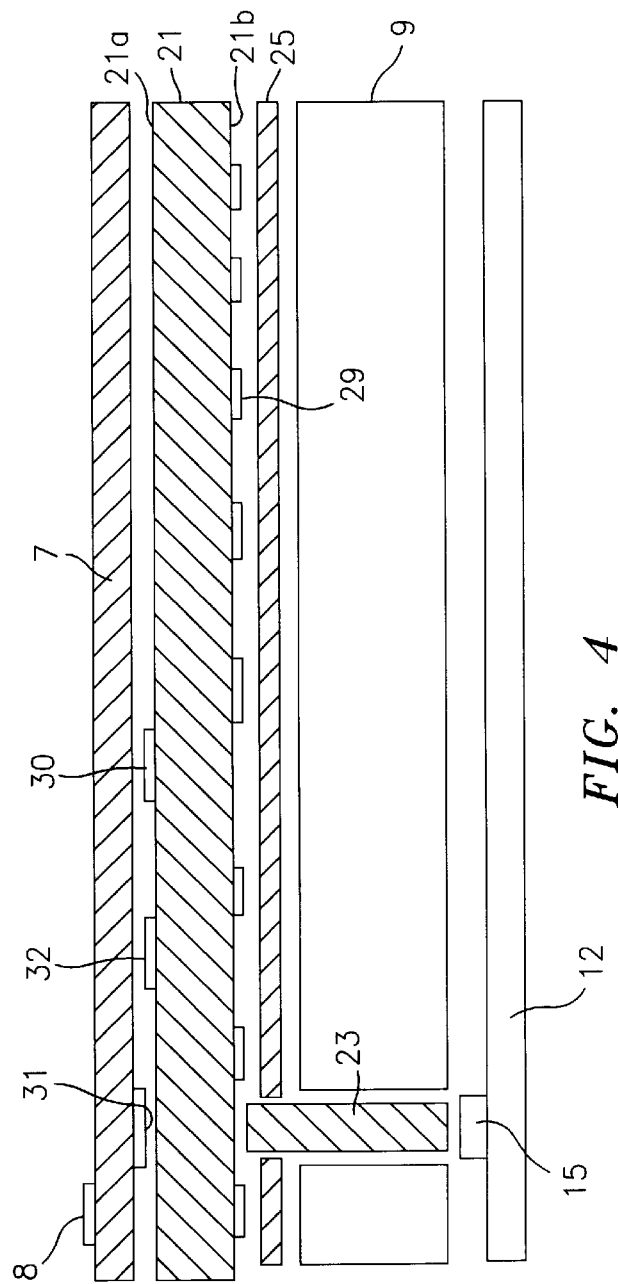

Referring now to the simplified schematic view of FIG. 4, the dial illumination system is shown in exploded elevation view and is not drawn to scale. It will be understood that the actual dimensions appear more as seen in FIG. 3 and that the elements to be described are actually in contact with one another so that the light is transmitted efficiently from one member to the next.

In its preferred embodiment, LED 15 is disposed on the printed circuit board 12 and permanently connected in circuit relation with other elements on the printed circuit board so as to constitute an integral part thereof. This is a very economical way to provide a concentrated light source. The watch movement 9 contains a number of elements previously described and drives the watch hands (not shown) above dial 7. Dial 7 is a light transmissive member of glass or plastic having indicia 8 printed thereon, so that a light source beneath dial 7 will illuminate the dial. Dial 7 acts as a diffuser to evenly distribute the light, but if desired, a separate diffuser layer can be added. The indicia are preferably opaque as to make indicia 8 readily readable at night.

Light guide 21 comprises a light conducting member of clear plastic, such as polycarbonate, having an upper surface 21a and a lower surface 21b. The surfaces are preferably planar but may not necessarily be so. The reflective member 25 disposed between light guide 21 and movement 9 is a thin sheet of white reflective Mylar or similar reflective material. This member 25 may not be required if the frame itself provides sufficient reflectivity.

Figure 12:
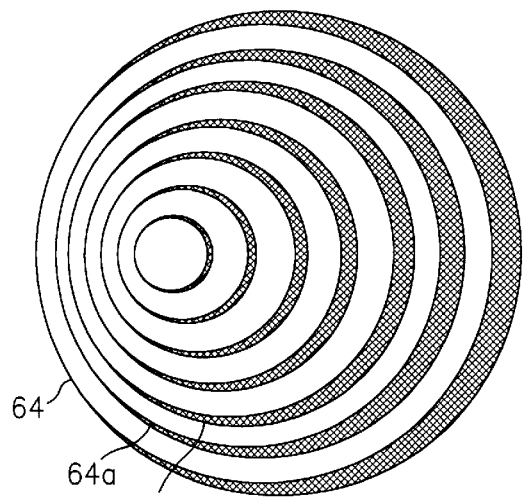

A light coupling channel 23 of clear plastic such as polycarbonate extends from LED 15 to the lower surface 21b of light guide 21. The channel is also used as a lens to shape the light coming out of the channel to maximize the amount of light captured in the guide. The light coupling channel 23 may be an optical elastomer or a rigid optically transmissive element. As shown later in FIGS. 12 and 13, the channel can be molded into the light guide or molded into the LED. Also, there is a bonding agent or clear elastomer between the molded channel and the light guide. This elastomer is used to maximize coupling of light into the guide and elastomeric material is used to absorb the mechanical tolerance stack-up between the guide, frame and PCB.

It is well known that light, once it is introduced into a light guide of optically transmissive material, will undergo multiple reflections internally. A reflection will occur at the interface of two materials having different indices of refraction. Multiple reflections will occur between the planar upper and lower surfaces 21a and 21b. It is also understood that the light intensity in the light guide diminishes as the distance from the light source increases.

EJECTION PATTERNS

In accordance with one aspect of the present invention, an ejection pattern of light reflective and dispersing elements 29 is arranged on the lower surface 21b of the light guide. Optionally, another ejection pattern may also be applied to the upper surface 21a. This is schematically indicated by a reflective and dispersing element 30, it being understood that this represents a plurality of elements. Elements 29 are preferably spots or areas of white reflective paint or ink or geometric surfaces molded or etched into the light guide which are arranged to selectively eject internally reflected light from the lower surface of the light guide toward the upper surface and toward dial 7. The portion of light which strikes the upper surface at less than a known "critical angle" (taken from a line perpendicular to the upper planar surface) is ejected (or passes through to dial 7). The remainder of the light is internally reflected, until it reaches another ejection element 29.

Referring now to FIGS. 5 through 8 of the drawings, four exemplary ejection patterns are illustrated.

Figure 5:
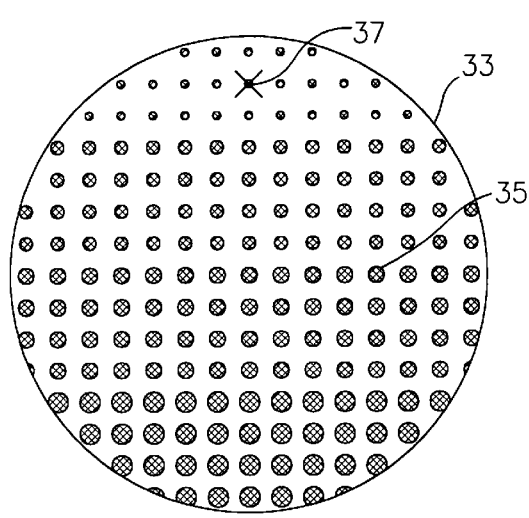

A preferred embodiment is shown in FIG. 5, wherein a light guide 33 is provided with an ejection pattern of reflective dots 35 applied to the lower planar surface, which are of gradually increasing diameter as the distance increases from the point of light insertion indicated at reference numeral 37. The larger dots cause a greater fraction of internally reflected light to be ejected through the top planar surface of the light guide 33 toward the dial. Therefore as the distance from the greatest light intensity at 37 increases, the reflective dots 35 have a greater ejection effect. This counteracts the diminishing intensity of light and results in a more uniform distribution of light emitted from the top of light guide 33.

Figure 6:
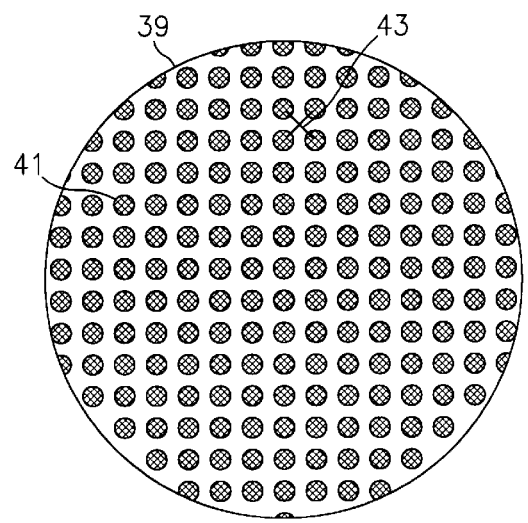

Referring to FIG. 6, a light guide 39 may also include uniformly spaced dots 41 of uniform size, but adapted to provide greater reflectivity or ejection capability as the distance increases from the light injection point indicated at 43. The manner of changing the reflectivity and light emitting qualities may suitably consist of changing the color or reflection characteristics of the dots without altering the size of the dots. For example, the dots may be varied from a grey, poorly reflective character near point 43 to a white, highly reflective character on the opposite side of the light guide. For molded ejectors, the geometry or shape of the ejector would be changed to even the pattern of ejected light.

Figure 7:
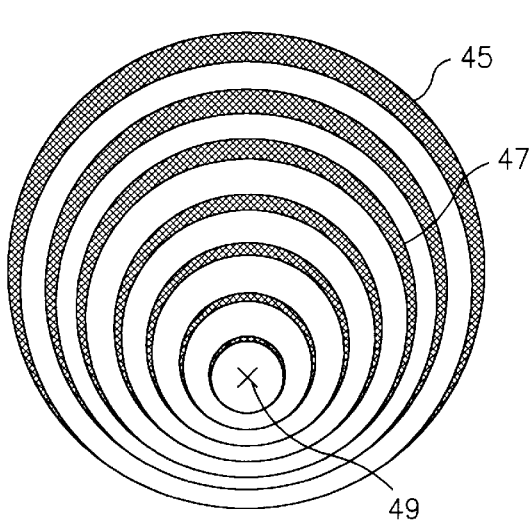
Figure 8:
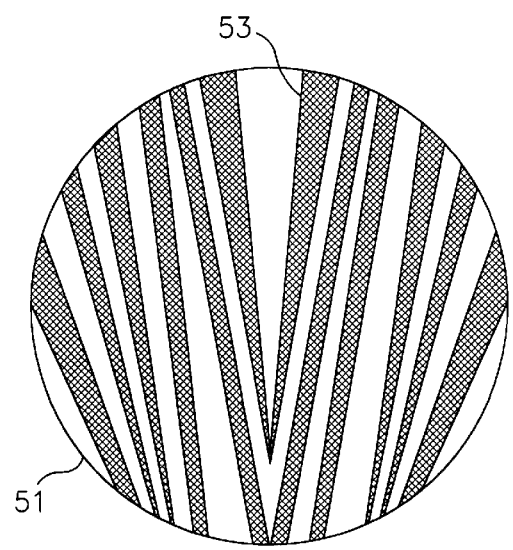

Referring to FIG. 7, a light guide 45 is provided with a pattern of circular elements 47 of ever increasing diameter, which also vary in width. The circular elements 47 have the greatest width at the greatest distance from a light injection point 49. Lastly, FIG. 8 illustrates a light guide 51 with an angular pattern of elements 53 designed to selectively eject light in a desired pattern according to any desired special requirements for graphical or aesthetic effects.

While the ejection patterns are preferably of reflective paint, they may also be composed of etched areas or indentations in the lower surface 21b, and optionally also in the upper surface 21a of the light guide.

ABSORTION PATTERNS

Referring to FIG. 4 and in accordance with another aspect of the present invention, the lower surface of dial 7 is provided with a pattern of light absorption elements indicated schematically by the element 31 adapted to selectively absorb light which is ejected from the ejection patterns of light guide 21, and also which passes directly through light guide 21 from the light source without internal reflection. Optionally an absorption pattern may also be added to the upper surface of the light guide. This is schematically indicated by a light absorbing element 32, it being understood that this represents a plurality of elements.

Figure 9:
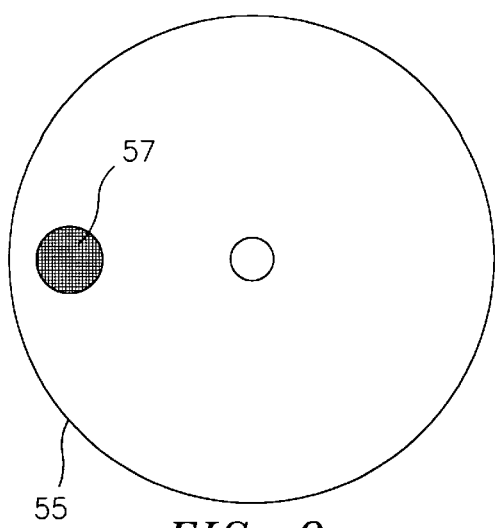

These absorption patterns on the lower dial surface (or upper light guide surface) are used in conjunction with the aforementioned ejection patterns. Exemplary absorption patterns are shown in FIGS. 9, 10, 11 and 12 of the drawings. In FIG. 9, a dial 55 includes a single circular spot 57 on its lower surface, which is arranged such that it is aligned with the end of the coupling channel on the opposite side of the light guide. The absorption pattern of the single element 57 is designed to manage the light that is not captured in the light guide, which would otherwise cause a bright spot which is of higher light intensity than that in the rest of the light guide to appear above the coupling channel.

Figure 10:
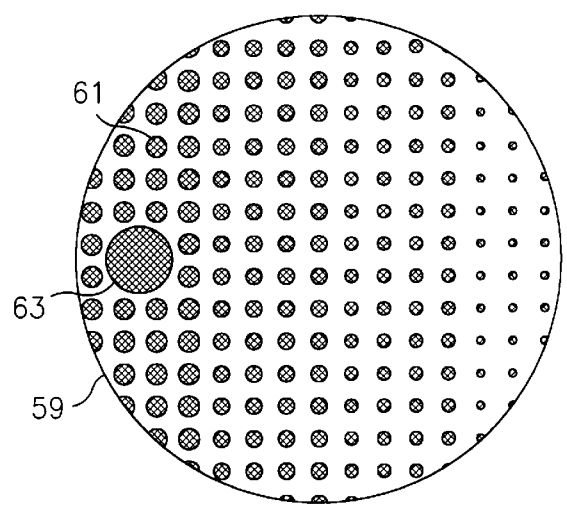

Another example of an absorption pattern is shown in FIG. 10, where a dial 59 is provided with multiple dots 61 of light absorbing material, and a larger dot 63 of light absorbing material which is aligned with the coupling channel. As seen in FIG. 10, the size of the light absorbing dots 61 decreases as the distance from the light absorbing element 63 increases. Therefore lesser and lesser ejected light is absorbed as the distance from the light source below dot 63 increases.

Figure 11:
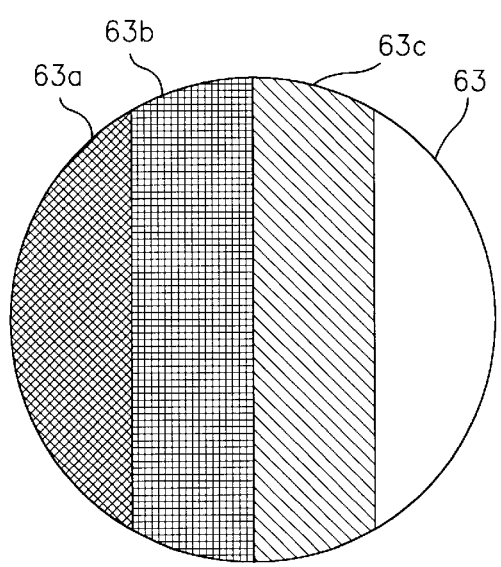

Another type of light absorbing patten, shown in FIG. 11 is a graduated light absorbing dial 63 which has sections 63a, 63b, 63c of lesser and lesser light absorbing capability as indicated by the shading. This may also be provided by a graduated pattern of dots of equal size, but of high spatial density nearest the area where the greatest absorption is required, and gradually changing to less spatial density as it moves away from the source.

While the patterns shown in FIGS. 9, 10 and 11 are intended to achieve a uniform light distribution, the absorption pattern may also be varied to achieve an aesthetic graphical presentation. This is illustrated by the exemplary pattern shown in FIG. 12. There, a dial 64 has a series of eccentric circles 64a, 64b, etc. of varying thickness printed on the dial. Any desired pattern may be used in place of that shown.

The absorption elements are preferably composed of light absorbing inks printed on the underside of the watch dial, which are selected to have the transmissibility and color to achieve the desired pattern.

MULTIPLE LIGHT SOURCES AND INTEGRATED CONSTRUCTIONS

As an alternative to a separate light coupling channel, the channel may be integrated either with the LED or with the light guide, and multiple light sources may be used for desired preselected aesthetic effects.

Figure 13:
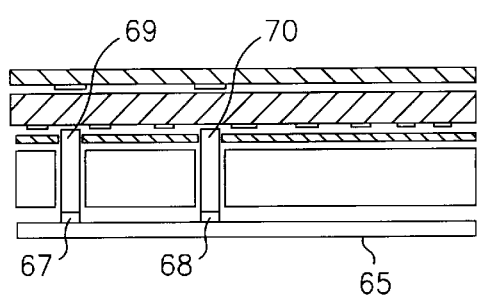

Referring to Fig. 13 of the drawing, a PC board 65 is diagrammatically illustrated with two LEDs 67, 68 and respective light coupling channels 69, 70 constructed as integral assemblies.

Figure 14:
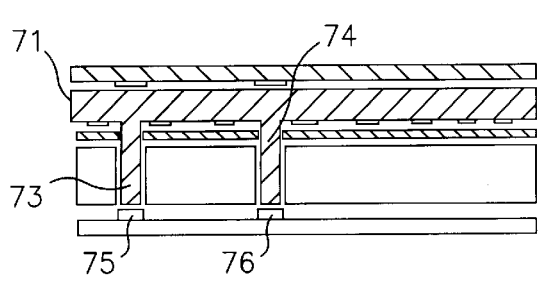

In FIG. 14, a light guide 71 includes two light coupling channels 73, 74 molded as integral parts thereof and extending from the lower planar surface, so that they can contact respectively corresponding LEDs 75, 76 on the underlying printed circuit board.

The light ejection patterns and light absorption patterns may also be located so as to manage illumination of difficult locations, such as the window in the dial of a day/date calendar watch. They may also be used to correct the shadowing effect of the hole in the center of the dial which admits the watch hand spindles.

By suitable combination of ejection patterns which selectively eject light and absorption patterns which selectively absorb the ejected light, a very uniform illumination system can be achieved using a concentrated light, or unique light distribution patterns can be designed to achieve a unique design goal using more than one light source. Moreover, by causing the light to enter the lower surface of the light guide, rather than at the peripheral edge, a compact and economical construction using a PC board mounted LED can be achieved.

While there has been described herein what is considered to be the preferred embodiment of the invention, other modifications will occur to those skilled in the art, and it is desired to secure in the appended claims all such modifications as fall within the true spirit and scope of the invention.

I claim:

1. An illumination system for a watch dial comprising:
   a light guide comprising a light conducting member having a periphery and upper and lower surfaces, and adapted to conduct light throughout by internal reflection between said upper and lower surfaces,
   a dial to be illuminated disposed above the light guide, said dial comprising a light transmissive member having a periphery substantially coextensive with that of the light guide and having a lower dial surface adjacent the light guide upper surface,
   at least one concentrated light source disposed below and spaced from the lower surface of said light guide,
   a light coupling channel extending from the light source to the lower surface of the light guide,
   an ejection pattern on at least the lower surface of the light guide adapted to selectively eject internally reflected light from the lower surface of the light guide through its upper surface toward the dial, and
   an absorption pattern on at least the lower dial surface adapted to selectively absorb light from the light source.

2. The illumination system according to claim 1, wherein said concentrated light source is at least one light emitting diode disposed on the PC board within a projection of the light guide periphery.

3. The illumination system according to claim 2, wherein the light coupling channel is an integral extension of the light emitting diode.

4. The illumination system according to claim 2, wherein the light coupling channel is an integral extension from the lower surface of the light guide.

5. The illumination system according to claim 1, wherein the ejection pattern is a plurality of reflective elements.

6. The illumination system according to claim 5, wherein the areas of the reflective elements increase as the distance from the light coupling channel increases.

7. The illumination system according to claim 5, wherein the reflectivities of the reflective elements increase as the distance from the light coupling channel increases.

8. The illumination system of claim 5, wherein the reflective elements are varied to achieve a preselected aesthetic pattern.

9. The illumination system according to claim 1, wherein the absorption pattern comprises at least a first area of light absorbing material disposed on the dial lower surface in alignment with the end of the light coupling channel adjacent the lower surface of the light guide.

10. The illumination system according to claim 1, wherein the absorption pattern is a plurality of light absorbing elements.

11. The illumination system according to claim 10, wherein the areas of the light absorbing elements decrease with distance from said first light absorbing material area.

12. The illumination system according to claim 10, wherein the absorption qualities of the light absorbing elements decreases with distance from said first light absorbing paint area.

13. The illumination system according to claim 10, wherein the spatial density of the light absorbing elements decreases with distance from the first light absorbing point area.

14. The illumination system according to claim 10, wherein the light absorbing elements are varied to achieve a preselected aesthetic pattern.

15. The illumination system according to claim 1, wherein a second ejection pattern is disposed on the upper surface of the light guide.

16. The illumination system according to claim 1, wherein a second absorption pattern is disposed on the upper surface of the light guide.

17. The combination according to claim 1, and including at least one additional concentrated light source and at least one additional light coupling channel arranged to provide a preselected aesthetic pattern.

18. The combination according to claim 1, wherein the light guide upper and lower surfaces are planar.

19. An illumination system for a watch dial comprising:

a light guide comprising a light conducting member having a periphery and upper and lower surfaces, and adapted to conduct light throughout by internal reflection between the upper and the lower surfaces, a dial to be illuminated disposed above the light guide, the dial comprising a light transmissive member having a periphery substantially coextensive with that of the light guide and having a lower dial surface adjacent the light guide upper surface, at least one concentrated light source disposed below and spaced from the lower surface of the light guide, a light coupling channel extending from the light source to the lower surface of the light guide, an ejection pattern on at least one of the upper and the lower surfaces of the light guide for selectively ejecting internally reflected light from the light guide to the dial, and an absorption pattern on at least one of the lower dial surface and the upper light guide surface for selectively absorbing light from the light source.

20. An illumination system for a watch dial comprising:

a light guide comprising a light conducting member having a periphery and upper and lower surfaces, and adapted to conduct light throughout by internal reflection between the upper and the lower surfaces, a dial to be illuminated disposed above the light guide, the dial comprising a light transmissive member having a periphery substantially coextensive with that of the light guide and having a lower dial surface adjacent the light guide upper surface, at least one concentrated light source disposed below and spaced from the lower surface of the light guide, a light coupling channel extending from the light source to the lower surface of the light guide, an ejection pattern on at least one of the upper and the lower surfaces of the light guide for selectively ejecting internally reflected light from the light guide to the dial, and an absorption pattern for selectively absorbing light from the light source, the absorption pattern being disposed between the light guide and the dial.

21. The illumination system according to claim 20, including a layer disposed between the dial and the lightguide, wherein the absorption pattern is disposed on at least one of an upper and a lower surface of the layer.

* * * * *